United States Patent [19]

Warzecha et al.

[11] 3,857,833
[45] Dec. 31, 1974

[54] PROCESS AND APPARATUS FOR THE UNIFORM ALKALIZATION OF CELLULOSE

[75] Inventors: Klaus Warzecha; Klaus Stölting; Wolfgang Schminke, all of Wiesbaden-Biebrich, Germany

[73] Assignee: Hoechst Aktiengesellschaft, Wiesbaden-Biebrich, Germany

[22] Filed: Dec. 7, 1970

[21] Appl. No.: 95,830

[30] Foreign Application Priority Data
Dec. 8, 1969  Germany............................ 1961455

[52] U.S. Cl................................ 260/233, 23/284
[51] Int. Cl. ........ C08b 1/08, C08b 1/10, C08b 1/14
[58] Field of Search.......................... 260/233; 8/125

[56] References Cited
UNITED STATES PATENTS

| | | | |
|---|---|---|---|
| 1,858,017 | 5/1932 | Lilienfeld............................ | 260/233 |
| 2,143,855 | 1/1939 | Bass.................................... | 260/233 |
| 2,600,253 | 6/1952 | Lutz................................... | 23/259.1 |

FOREIGN PATENTS OR APPLICATIONS

| | | | |
|---|---|---|---|
| 434,540 | 9/1935 | Great Britain...................... | 260/233 |
| 1,054,442 | 4/1959 | Germany............................ | 260/233 |
| 1,066,588 | 4/1967 | Great Britain...................... | 260/233 |

*Primary Examiner*—Donald E. Czaja
*Assistant Examiner*—Ronald W. Griffin
*Attorney, Agent, or Firm*—James E. Bryan

[57] ABSTRACT

This invention relates to a process and apparatus for the production of uniformly mercerized alkali cellulose, which process comprises introducing pulverized cellulose into an upwardly directed gas current, and spraying a quantity of alkali hydroxide solution countercurrently to the gas current, the gas current having a lifting force such that any cellulose particles which have not been wetted or have been only insufficiently wetted are maintained in the turbulent zone, whereas cellulose particles which have been reacted to the desired degree sink, due to their highest specific gravity, against the gas current to a zone where they are no longer subject to the action of alkali hydroxide solution.

5 Claims, 1 Drawing Figure

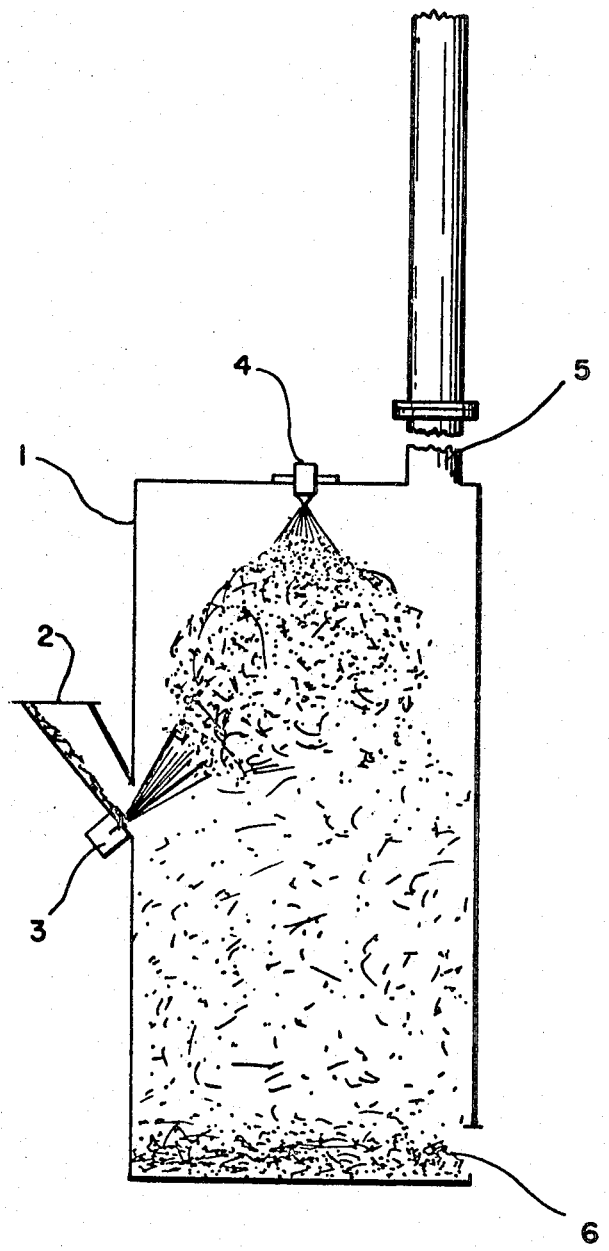

PROCESS AND APPARATUS FOR THE UNIFORM ALKALIZATION OF CELLULOSE

This invention relates to the production of uniformly mercerized flocculent alkali cellulose particles having a defined alkalization degree.

It has been long known that alkali cellulose, which serves as an intermediate product in the preparation of regenerated cellulose, cellulose esters and cellulose ethers, for example, can be produced by steeping or slurry alkalization. For this purpose, dilute sodium hydroxide solution is caused to act upon the cellulose, either by placing the cellulose sheets in a bath containing sodium hydroxide solution, or by reducing the cellulose sheets to shreds within such a bath. When the solid mass has become impregnated with the sodium hydroxide solution, it is squeezed out until a certain molar ratio between cellulose and alkali has been achieved. This process has serious disadvantages, however: On the one hand, irrespective of whether the size reduction precedes or follows the treatment with sodium hydroxide solution, the cellulose cannot be comminuted as uniformly as to avoid the formation of coarser particles, so-called pricks, which are not easily accessible to a subsequent reaction and, for example during etherification, form a proportion of insoluble product which may be quite substantial in some cases. On the other hand, in this method of processing cellulose, a considerable excess of alkalizing medium and also of water is required, because only in this case can a sufficient alkalization be achieved. Although concentrated sodium hydroxide solution will superficially attack the cellulose within a short time, it penetrates only slowly into the fibers against the capillary pressure therein due to its high surface tension, and thus causes an incomplete and non-uniform swelling of the cellulose fibers. Dilute sodium hydroxide solution is superior in this respect, but it has the disadvantage that excess water is introduced which may have an unfavorable effect, e.g. during subsequent esterification or etherification of the alkali cellulose produced.

During the likewise known slurry alkalization, the conditions are somewhat more favorable. In this process, the cellulose is first ground and then mixed in a horizontal drum, by means of blades, with sodium hydroxide solution supplied in the form of a thin jet. The uniformity of mercerization achievable by this process, however, is not altogether satisfactory.

Further, it is known to avoid an excess of sodium hydroxide solution by continuously mixing ground cellulose with an atomized mercerization agent, i.e. by causing both reaction partners to react in a finely distributed form and in exactly measured amounts. By this process, it is also possible to adjust the desired degree of alkalization by using an alkali hydroxide solution of the desired concentration. Further, the reaction period required can be considerably reduced, as compared with the afore-mentioned process. Nevertheless, an absolutely uniform mercerization cannot be achieved by this process, because even when the reaction partners are employed in stochiometric proportions, as a whole, the possibility of local deviations in the proportions, which may cause an excess of or a deficiency in sodium hydroxide solution in some parts, cannot be altogether excluded.

The present invention overcomes this still existing difficulty, by providing a means by which, within as short a time as possible and while avoiding local and/or temporary variations in the supply of sodium hydroxide solution, cellulose can be alkalized to a high degree of uniformity and to a definite, predetermined reaction degree.

According to the present invention, this is achieved by a process for the production of uniformly mercerized alkali cellulose by continuously mixing, in a reaction vessel, a measured quantity of sprayed pulverized cellulose with a mist of sprayed aqueous alkali hydroxide solution in a quantity which is likewise measured and corresponds to the desired degree of reaction. In the process the cellulose is introduced into a gas current directed upwardly in the reaction vessel and is whirled up therein, the alkali hydroxide solution is sprayed in a direction countercurrent to the direction of the gas current, so that the cellulose is homogeneously wetted while avoiding a local and/or temporary excess of or deficiency in alkali hydroxide solution, the current of gas being adjusted such that, by its lifting force, those cellulose particles which have not been wetted or only insufficiently have been wetted are maintained in the zone of turbulence, whereas the cellulose particles which have been reacted to the desired degree sink down, due to their specific gravity, against the gas current to the bottom, where they are no longer subjected to the action of further alkali hydroxide solution being sprayed thereon and are removed from the reaction vessel.

When cellulose particles are wetted with alkali hydroxide solution, their weight is naturally increased by the weight of the absorbed quantity of sodium hydroxide solution. It is true that alkali hydroxides also have a swelling action upon cellulose, but this is a relatively slow process, so that the first result is a marked increase of the specific gravity of the cellulose particles, which is only gradually superposed by a decrease of density, when the swelling action sets in. When the action of the sodium hydroxide solution is short enough, the quantity of sodium hydroxide solution absorbed and the increase in the specific gravity of a cellulose particle are proportional to each other. This fact is utilized by the present invention for achieving an equal degree of alkalization for all cellulose particles, which degree of alkalization is dependably stopped at a predetermined, variable reaction degree. This is achieved by introducing into the reaction vessel a spray of pulverized cellulose and a mist of a finely distributed alkali hydroxide solution in quantities which are constant per unit of time and correspond to the desired degree of alkalization of the cellulose, and reacting the two components while whirling them vigorously about. The current of gas which serves for whirling the cellulose particles is directed upwardly from below and is adjusted such that it just keeps floating the reaction mixture at a certain degree of alkalization. As soon as a cellulose particle absorbs more sodium hydroxide solution than corresponds to the equilibrium between the gravity acting upon the particle and the lifting force of the gas current, the particle sinks down against the current of gas. Thereby, it leaves the mixing zone and is no longer subjected to the action of further quantities of sodium hydroxide solution sprayed thereon. The swelling of the particle which now begins is no longer of disadvantage, so that it even may be possible for the reaction product to undergo an after-swelling process in the lower part of the reaction vessel before being removed from the vessel, either batchwise or continuously.

It has been found that the process of the invention results in particularly favorable reaction products when the cellulose used as the starting material is ground to a particle size of less than 300 μm before it is mixed with the alkalizing medium.

The preferred alkalizing medium is an about 20 to 50 percent by weight aqueous sodium hydroxide solution. Sodium hydroxide solutions of a higher degree of dilution or of stronger concentration also may be used, but concentrations between 15 and 60 percent by weight are regarded as the approximate limits for sodium hydroxide solutions suitable for practical purposes. Of course, the sodium hydroxide solution may be replaced by solutions of other alkali hydroxides.

The process of the invention has proved to be equally advantageous within a wide range of reactions, i.e. for achieving the most varied degrees of alkalization. The process is operated with particlular advantage when cellulose and alkali hydroxide solution are caused to react with each other in proportions by weight ranging from about 1:0.8 to 1:2.

As already pointed out, it is essential for the functioning of the process of the invention that the wetting of the cellulose particles with a quantity of alkali hydroxide corresponding to the desired degree of reaction takes place within a short time. A particularly uniform mercerization is achieved when the cellulose particles do not stay for more than about 20 seconds, on the average, within the mixing zone containing the unreacted dosium hydroxide solution.

A further feature of the present invention is an apparatus for performing this process, such as is shown in FIG. 1 attached hereto. Of course, the invention is not to be limited to the embodiment shown in the drawing. The apparatus includes a reaction vessel 1, a lateral filling funnel 2 for pulverized cellulose, an adjustable gas nozzle 3 directed into the interior of the reaction vessel for spraying the cellulose introduced, an adjustable two-component nozzle 4 directed into the interior of the reaction vessel for spraying the alkali hydroxide solution, a gas outlet 5, and a discharge opening 6 for removal of the reaction product, the gas nozzle being disposed immediately below the filling funnel and being directed upwardly at a high angle, and the two-component nozzle being disposed in the upper part of the reaction vessel and being directed substantially vertically downwardly, so that their two jets impinge upon each other in the interior of the reaction vessel, and the gas outlet being disposed in the upper part of the reaction vessel and the discharge opening being disposed in the lower part of the reaction vessel.

In view of the fact that it is desirable to introduce the pulverized cellulose as continuously as possbiel, it has proved advantageous to fit the filling funnel 2 to the well of the reaction vessel 1 at an angle between 10° and 40° to the vertical.

In a particular embodiment of the apparatus according to the invention, several filling funnels 2 are attached to the outside of the wall and are spaced around the reaction vessel, preferably at the same level, or the filling funnel 2 is of such construction that it forms an annular chute without bottom, or an annular groove having a plurality of separate openings in its bottom. In this manner, the cellulose powder may be fed particularly uniformly into the reaction vessel.

In this case, it is of advantage to use not a single gas nozzle 3, but to distribute a plurality of gas nozzles 3, preferably at the same level, on the inside of the wall of the reaction vessel, each below one of the filling funnels 2, or to use an annular gas nozzle 3. In this way, the pulverized cellulose is whirled up particularly uniformly. Moreover, this embodiment of the invention produces a particularly homogeneous flow profile, which allows a particularly exact adjustment of the equilibrium between gravity and lifting force.

It will be obvious to those skilled in the art that many modifications may be made within the scope of the present invention without departing from the spirit thereof, and the invention includes all such modifications.

What is claimed is

1. A process for the production of uniformly mercerized alkali cellulose which comprises introducing pulverized cellulose into an upwardly directed gas current, and spraying alkali hydroxide solution countercurrently to the gas current, the gas current having a lifting force such that any cellulose particles which have not been wetted or have been only insufficiently wetted are maintained in the turbulent zone, whereas cellulose particles which have been reacted to the desired degree sink, due to their higher specific gravity, against the gas current to a zone where they are no longer subject to the action of alkali hydroxide solution.

2. A process according to claim 1 in which the initial pulverized cellulose has a particle size less than 300 μm.

3. A process according to claim 1 in which the alkali hydroxide solution is a 15 to 60 percent by weight solution of sodium hydroxide.

4. A process according to claim 1 in which the cellulose and alkali hydroxide solution are mixed in weight proportions in the range of about 1:0.8 to 1:2.

5. A process according to claim 1 in which the spraying time of the alkali hydroxide solution upon the individual cellulose particles does not exceed about 20 seconds.

* * * * *